United States Patent [19]

Hinkle et al.

[11] Patent Number: 5,033,201

[45] Date of Patent: Jul. 23, 1991

[54] ROTARY CUTTING CYLINDER BLADE HEIGHT SETTING GAUGE

[75] Inventors: Doyle Hinkle, Ellisville; Stephen T. Werner, Dittmer, both of Mo.

[73] Assignee: Roto-Die Company, Inc., St. Louis, Mo.

[21] Appl. No.: 512,195

[22] Filed: Apr. 20, 1990

[51] Int. Cl.$^5$ .............................................. B27G 23/00
[52] U.S. Cl. ........................................ 33/641; 033/633
[58] Field of Search .................. 33/626, 636, 637, 641, 33/833, 628, 632, 634

[56] References Cited

U.S. PATENT DOCUMENTS

| | | | |
|---|---|---|---|
| 89,394 | 4/1969 | Evans | 33/635 |
| 1,225,552 | 5/1917 | Wuesthoff | 33/634 |
| 2,496,800 | 2/1950 | Larkins | 33/628 X |
| 2,539,831 | 1/1951 | Hacker | 33/628 |
| 2,700,993 | 2/1955 | Pence | 336/628 X |
| 2,747,291 | 5/1950 | Snyder | 336/633 |
| 4,519,142 | 5/1985 | Parker | 33/628 |

Primary Examiner—Harry N. Haroian

Attorney, Agent, or Firm—Rogers, Howell & Haferkamp

[57] ABSTRACT

A tool for use in setting the height of a cutting blade mounted in a rotary cutting cylinder includes an anvil that is mounted to the rotary cutting cylinder by a lost motion connection assembly. The lost motion connection assembly permits the mounted anvil to move radially relative to the cylinder, while preventing tangential and rotative movement of the anvil relative to the cylinder. The tool includes a pair of dowel pins that are inserted in radial holes provided in the cylinder to mount the anvil to the cylinder. The lost motion connection assembly connects the dowel pins to the anvil in a manner that permits the radial movement of the anvil relative to the pins and the cylinder. The anvil mounted on the cylinder is moved radially toward the cutting blade of the cylinder until it rests on top of the cutting edge of the blade, and is then tapped lightly to drive the cutting blade downward into the blade slot formed in the cylinder. The proper positioning of the blade in the blade slot formed in the cylinder is achieved when the anvil contacts both the cutting edge of the blade and the rotary cutting cylinder simultaneously.

14 Claims, 1 Drawing Sheet

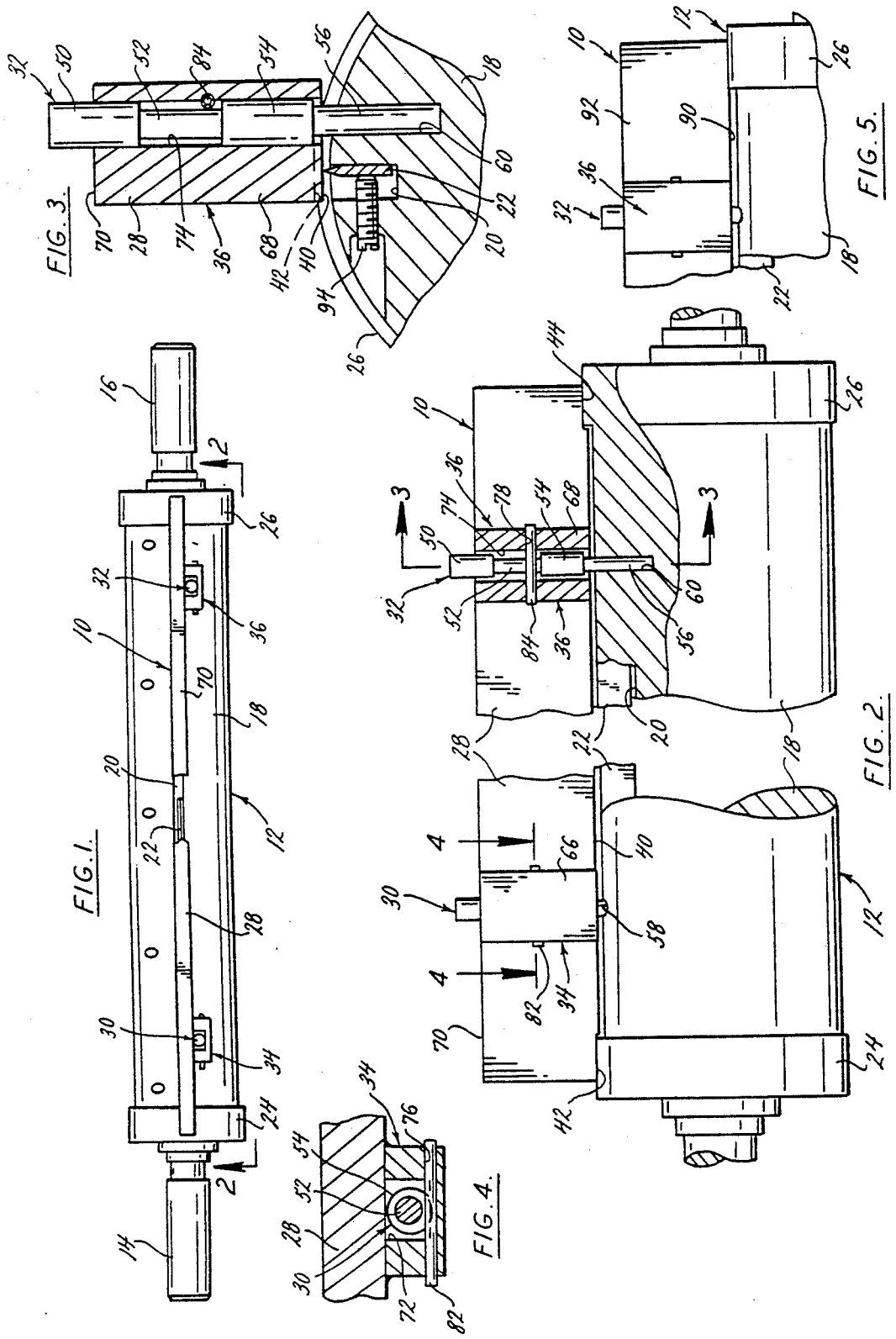

ROTARY CUTTING CYLINDER BLADE HEIGHT SETTING GAUGE

BACKGROUND OF THE INVENTION (1) Field of the Invention

The present invention pertains to a height setting gauge used in setting the height of a cutting blade mounted in a rotary cutting cylinder. In particular, the present invention pertains to a gauge used in setting the height of a cutting blade mounted in a rotary cutting cylinder of the type disclosed in U.S. Pat. No. 4,715,250.

(2) Description of the related art

Many tools and gauges have been employed in the past in setting the height of cutting blades mounted in rotary cylinders. Many of these known height setting tools are disadvantaged in that they require that the rotary cylinder first be completely disassembled from the cutting machine prior to setting the height of the cutting blade in the cylinder. The necessity of removing the rotary cylinder from the machine prior to setting the blade height adds significantly to the time required for maintenance of the machine, and increases the down time of the machine during which it is not productive.

Many height setting tools have been developed that set the blade height of a rotary cutting cylinder without removing the cylinder from the cutting machine. Often these tools or gauges comprise complicated and elaborate assemblies that engage both the cutting edge of the blade and a second edge of the blade opposite to the cutting edge in order that they may adjust the position of the blade into a out of the blade receiving slot of the rotary cutting cylinder. The increased number of component parts of such height setting tools requires an increased amount of time in connecting the tool to the blade, and in operating the tool to correctly position the blade relative to the rotary cutting cylinder. These types of tools are further disadvantaged in that their increased number of component parts increases the cost of producing the tool.

The present invention overcomes disadvantages associated with prior art cutting blade height setting tools by providing a blade height setting gauge for adjusting the height of a blade in a rotary cutting cylinder that is comprised of a minimum number of component parts, and is consequently inexpensive to manufacture and simple to use. The blade height setting gauge of the invention is also designed to be used on a rotary cutting cylinder without removing the cylinder from the cutting machine, thereby substantially reducing the time required to adjust the blade height of the rotary cutting cylinder, and in turn reducing the unproductive down time of the machine. The blade height setting gauge of the invention is further advantaged in that its simplified construction lends to its ease of operation in connecting the gauge to the rotary cutting cylinder, setting the blade height of the cylinder, and removing the gauge from the adjusted cylinder.

It is therefore an object of the present invention to provide a blade height setting gauge used in setting the height of a rotary cutting cylinder of the type disclosed in U.S. Pat. No. 4,715,250, where the gauge is inexpensive to manufacture, is easy to use, provides fast and accurate blade height adjustment, and can be used on a rotary cutting cylinder without removing the cylinder from the cutting machine.

SUMMARY OF THE INVENTION

The cutting blade height setting gauge of the present invention is preferably used to set the height of a cutting blade on a rotary cutting cylinder of the type disclosed in U.S Pat. No. 4,715,250. However, it should be understood that although the present invention is described as being used to set the height of a cutting blade in one type of rotary cutting cylinder, the invention is equally well suited for setting the blade height of blades used in a variety of machines, where the blade is mounted in a rotary cylinder of the machine.

The blade height setting gauge of the present invention is generally comprised of an anvil, a pair of supporting pins, and a pair of lost motion connector assemblies connecting the pins to the anvil.

The anvil is essentially a solid rectangular bar with a bottom surface of the bar being adapted to engage the cutting edge of a cutting blade and a portion of the rotary cutting cylinder mounting the blade. In one embodiment of the invention the bottom surface of the anvil is planar across the entire length of the bar, except for depressions formed in the bottom surface at the opposite ends of the bar. This embodiment of the invention is intended to be used in setting the blade height of a rotary cutting cylinder having drive rolls press fit into the cutting cylinder at its opposite ends. The depressions at the ends of the bottom surface of the bar are provided to engage the surface of the cylinder drive rolls, and are dimensioned to position the bottom surface of the cutting bar a slight distance below the surface of the drive rolls when the depressed portions of the bar bottom surface contact the drive rolls. This in turn will set the cutting edge of the blade a slight distance below the surface of the drive rolls, the distance corresponding to the depth of the depressed portions of the bottom surface of the bar. Setting the blade height slightly below the surface of the drive rolls with this embodiment of the invention, positions the cutting blade to make only a partial cut through material passed through the rotary cutting cylinder and a mating rotary anvil cylinder. This blade height adjustment is primarily used in cutting layered materials such as a sheet of paper having an adhesive on one side that joins the paper to a backing sheet. Running such a sheet of layered paper through a rotary cutting cylinder with the height of the blade of the cylinder set in the manner described above would result in the blade cutting through only the self-adhesive paper, and not cutting through the backing sheet. This blade height setting is primarily used in the production of self-adhesive labels that are peeled form the backing sheet prior to their application. In a second embodiment of the anvil bar, the bottom surface of the bar is planar across its entire length. This embodiment of the invention is used to set the blade cutting edge at a height equal to the height of the drive rolls above the rotary cutting cylinder. This blade height setting is primarily used where the cylinder is used to make a complete cut through material passed between the rotary cutting cylinder and a mating anvil cylinder.

The pair of supporting pins are formed from cylindrical dowels, with each dowel having two reduced diameter sections. Each dowel is formed with one of its ends having a reduced diameter, and with a middle portion of the dowel having a reduced diameter. A cylindrical land of increased diameter is provided at the second end of the dowel, and an increased diameter cylindrical land is also provided at a middle portion of the dowel separating the two reduced diameter portions.

The rotary cutting cylinder, with which the height setting gauge of the present invention is intended to be used, is modified with a pair of holes bored radially into the cylinder, the diameter of the holes being sized to receive the reduced diameter ends of the pair of dowels.

The lost motion connector assemblies coupling the pair of dowels to the anvil bar are comprised of a pair of blocks secured to one side of the anvil bar, with a channel extending through each block transverse to the length of the bar. The channel is dimensioned to just receive the large diameter lands of the supporting pins. In assembling the supporting pins to the anvil bar, the pins are inserted into the channels of the blocks with the reduced diameter ends of the pins extending downward from the blocks. A set pin is then inserted through a hole bored transversely through each block. The inserted set pins intersect the channel of each block in an area of the channel between the increased diameter lands of the support pin received in the channel. Inserting the set pins between the increased diameter lands of the support pins forms a lost motion connection between each support pin and its respective block. The lost motion connection permits limited axial movement of the support pin through the block channel, the movement being limited by the support pin lands engaging the transverse set pin inserted in the block channel.

With the blade height setting gauge of the present invention constructed in the manner described above, the reduced diameter end of each support pin of the pair is first inserted into the hole sized for the support pin that has been drilled radially into the rotary cutting cylinder. The holes drilled into the cylinder for the support pins are positioned adjacent the blade holding slot of the cylinder, and are spaced apart to correspond to the spacing of the support pins on the height setting gauge. The support pins are inserted into the holes so that the anvil is positioned directly above a cutting blade received in the cylinder slot. With the pair of support pins so inserted, the height setting gauge of the invention is securely supported on the rotary cutting cylinder and is ready for use. The connection between the rotary cutting cylinder and the blade height setting gauge permits the anvil of the gauge to be moved radially a slight distance relative to the cylinder, while preventing the anvil from moving tangentially or rotatively relative to the cutting cylinder. With the support pins installed in their respective bore holes in the rotary cutting cylinder, the anvil is lowered onto the cutting edge of the blade and is tapped lightly on its top surface until the blade engages the bottom surface of the anvil across its entire length. The machine operator then need only tap the top surface of the anvil with a hammer or other similar tool to drive the blade downward into the slot of the cutting cylinder toward its desired height extending from the cylinder slot. When the anvil is driven down far enough so that the opposite ends of the bottom surface of the anvil contact the surface of the drive rollers of the cutting cylinder, the blade is set at its proper cutting height across its entire length. The operator will know that the blade is set at its proper height by the change in the tone of the sound made by tapping on the top surface of the anvil, when the opposite ends of the anvil bottom surface solidly contact the surfaces of the drive rollers of the cutting cylinder. After the cutting blade has been set to its proper height in the manner discussed above, the operator need only pull the anvil bar radially away from the cutting cylinder to disengage the support pins from their engagement in the holes provided in the cutting cylinder, and to separate the blade height setting gauge of the invention from the cutting cylinder.

BRIEF DESCRIPTION OF THE DRAWINGS

Further objects and features of the present invention are revealed in the following detailed description of the preferred embodiment of the invention and in the drawing figures wherein:

FIG. 1 is a segmented plan view of the blade height setting gauge of the present invention in its operative position mounted on a rotary cutting cylinder;

FIG. 2 is a segmented elevation view, partially in section, of the height setting gauge of the present invention taken along the line 2—2 of FIG. 1;

FIG. 3 is an elevation view in section of the height setting gauge of the present invention taken along the line 3—3 of FIG. 2;

FIG. 4 is a plan view in section of the height setting gauge of the present invention taken along the line 4—4 of FIG. 2; and FIG. 5 is a segmented elevation view of an alternative embodiment of the height setting gauge of the present invention mounted on a rotary cutting cylinder.

DESCRIPTION OF THE PREFERRED EMBODIMENT

FIG. 1 shows the blade height setting gauge 10 of the present invention mounted in its operative position on a rotary cutting cylinder 12 of the type disclosed in U.S. Pat. No. 4,715,250. The cutting cylinder 12 is generally comprised of a pair of stub shafts 14, 16 provided at its opposite ends for mounting the cylinder in a cutting machine, a cylindrical central section 18 that includes a longitudinal slot 20 for mounting a cutting blade 22, and a pair of drive rolls 24, 26 press fit onto the opposite ends of the cutting cylinder central section. The structure of the rotary cutting cylinder 12 is described in more detail in the U.S. Pat. No. 4,715,250, and will not be further described here.

The blade height setting gauge of the present invention is generally comprised of an anvil member 28, a pair of dowel supporting pins 30, 32 that form the structure for mounting the gauge to the cutting cylinder 12, and a pair of lost motion connection assemblies 34, 36, each assembly connecting a dowel support pin to the anvil member.

The anvil member 28 is basically a solid rectangular metal bar that is dimensioned long enough to reach completely across the length of the rotary cutting cylinder and contact the drive rollers 24, 26 at the opposite ends of the cylinder as shown in FIGS. 1 and 2. A center portion of the bottom surface 40 of the anvil member is planar, adapting the bottom surface to engage the cutting edge of the rotary cutting cylinder blade 22 across its entire length. A pair of surface depressions 42, 44 are provided in the bottom surface of the anvil member at its opposite ends. The pair of depressions 42, 44 engage the drive rollers 24, 26, and allow the center bottom surface 40 of the anvil member to extend below the plane of the drive rollers 24, 26 to position the cutting edge of the blade 22 below the plane of the drive rollers in a manner to be described.

The pair of dowel support pins 30, 32 are provided to removably support the height setting gauge 10 on the rotary cutting cylinder 12. Each dowel is formed with an increased diameter land 50 at its top end, a reduced diameter mid-portion 52 directly below the top land 50, an increased diameter mid-portion 54 directly below the reduced diameter mid-portion 52, and a reduced diameter bottom end 56. The rotary cutting cylinder with which the height setting gauge is to be used is modified by boring a pair of holes 58, 60 radially into the central section 18 of the cutting cylinder 12. The holes are bored adjacent the cylinder slot 20, and the hole diameters are dimensioned to receive the reduced diameter bottom ends 56 of the dowels 30, 32.

The lost motion connection assemblies 34, 36 that connect the pair of dowel support pins 30, 32 to the anvil member 28 are each generally comprised of a block housing 66, 68 secured to one side of the anvil bar. Each block housing extends across the entire height of the bar between its bottom surface 40 and its top surface 70, and comprises an interior channel 72, 74 that extends upward through the entire length of the housing 66, 68. A transverse bore hole 76, 78 is drilled through each block housing 66, 68. The transverse holes 76, 78 intersect the channels 72, 74 of the housings off to one side of the channels. The bore holes 76, 78 are dimensioned to receive and securely hold set pins 82, 84 that are inserted through the bore holes. The set pins 82, 84 are provided to limit the movement of the dowel pins 30, 32 in the block housing channels 72, 74 in a manner to be described.

In assembling the dowel pins 30, 32 in the block housings 66, 68, to form the lost motion connection between the dowel pins and the anvil member 28, the dowel pins 30, 32 are first inserted in the block housing channels 72, 74, prior to the insertion of the set pins 82, 84. The dowel pins 30, 32 are positioned in the channels 72, 74 with their large diameter land ends 50 positioned adjacent the top surface 70 of the anvil member 28 as shown in FIGS. 2 and 3. The dowel pins 30, 32 are then centered in the block housing channels 72, 74 so that the reduced diameter mid-portions 52 of the pins are positioned adjacent the transverse bore holes 76, 78 through the block housings 66, 68. With the dowel pins centered in this position, the set pins 82, 84 are then inserted through the respective bore holes 76, 78 of the block housings 66, 68 to the positions shown in FIGS. 2-4. In this position of the set pins 82, 84, the set pins will engage the increased diameter mid-portions 54 of the dowel pins 30, 32 as the pins are pressed upward through the channels 72, 74, and the set pins will engage the increased diameter top ends 50 of the dowel pins 30, 32 the dowel pins are pressed downward through the block housing channels 72, 74. This assembly forms the lost motion connection between the dowel support pins and the anvil bar that permits the dowel pins 30, 32 to reciprocate upward and downward to a limited extent in the block housing channels 72, 74, while preventing the dowel pins 30, 32 from being completely removed from the block housing channels 72, 74.

An alternate embodiment of the height setting gauge of the present invention is shown in FIG. 5 of the drawings. This embodiment of the invention is substantially identical to the previously described embodiment, except that the bottom surface 90 of the anvil member 92 is planar across its entire length and does not comprise depressed surface sections at its opposite ends as did the anvil member bottom surface 40 of the previously described embodiment. This embodiment of the height setting gauge of the present invention is used in setting the blade height of a rotary cutting cylinder employed in making cuts completely through material passed between the rotary cutting cylinder and its mating anvil cylinder. As should be apparent from FIG. 5, without the depressed end surfaces in the bottom surface 90 of the anvil member 92, the blade height set by this embodiment will extend upward to the plane of the drive rollers 24, 26 of the rotary cutting cylinder. With the blade set at this height, there is no space provided between the cutting edge of the blade and the mating anvil roller and the blade edge will press against the mating anvil roller as it is rotated past the anvil roller, thereby cutting completely through material passed between the rotary cutting cylinder and the mating anvil roller.

In use, the blade height setting gauge 10 of the invention is first positioned over the blade slot 20 of a rotary cutting cylinder 12 in which a blade 22 has been inserted. With the gauge 10 held above the blade 22, the machine operator inserts the bottom reduced diameter ends 56 of the dowel pins 30, 32 into the radial holes 58, 60 drilled in the rotary cutting cylinder. Inserting the dowel pins 30, 32 into the respective cylinder holes 58, 60 supports the blade height setting gauge of the invention on the rotary cutting cylinder without removing the cylinder from the machine, and positions the anvil member 28 of the height setting gauge directly above the blade 22 mounted in the slot 20 of the cylinder. The operator next lowers the anvil member 28 on the pair of dowel pins 30, 32, until the bottom surface 40 of the anvil member contacts the cutting edge of the blade 22 across the entire length of the blade. If the blade 22 has been initially inserted into the slot 20 in an uneven manner so that it does not contact the bottom surface 40 of the anvil member across its entire length, the operator need only tap lightly on the top surface 70 of the anvil member to drive the blade 22 downward slightly in the slot to establish contact between the bottom surface 40 of the anvil member and the blade along its entire length. The operator continues to tap lightly on the top surface 70 of the anvil member 28 with a hammer or other striking tool to continue to drive the blade 22 downward into the slot 20 until the depressed end sections 42, 44 of the bottom surface contact the drive rollers 24, 26 at the opposite ends of the cutting cylinder 12. The tone of the sound produced by the operator tapping on the top surface 70 of the anvil member will change slightly when the depressed surface sections 42, 44 of the anvil bottom surface 40 contact the respective drive rollers 24, 26 at the opposite ends of the cutting cylinder, thereby indicating to the machine operator that the cutting blade 22 has been set at its desired height in the slot 20 of the cylinder. The operator then tightens down the set screws 94 of the cutting cylinder to securely hold the blade 22 in its adjusted position. With the set screws 94 tightened, the operator then lifts the anvil member 28 away from the blade 22 and removes the dowel pins 30, 32 from their respective cylinder bore holes 58, 60 to remove the blade height setting gauge 10 from the rotary cutting cylinder.

From the description of the rotary cutting cylinder blade height setting gauge of the present invention presented above, and the description of the method of using the height setting gauge of the invention, it can be seen that the present invention provides a height setting blade that is inexpensive to manufacture, is simple to operate, and provides accurate height adjustment of cutting blades of rotary cutting cylinders with a minimum of steps involved and a minimum of down time of the cutting machine.

While the present invention has been described by reference to specific embodiments, it should be understood that modifications and variations of the invention may be constructed without departing from the scope of the invention defined in the following claims.

What is claimed is:

1. A tool for use in setting the height of a cutting blade mounted in a rotary, cutting cylinder, the tool comprising:
   an anvil means;
   a support means connected to the anvil means and adapted to be connected to the rotary cutting cylinder to support the anvil means on the cylinder while enabling the anvil means to move radially relative to the cylinder; and
   a connecting means connecting the support means to the anvil means, the connecting means enabling the anvil means to move relative to the support means.

2. The tool of claim 1 wherein:
   the support means is adapted to support the anvil means over the blade mounted in the rotary cutting cylinder.

3. The tool of claim 1 wherein:
   the support means is adapted to enable the anvil means to move radially relative to the cylinder and contact the cutting blade mounted in the cylinder.

4. The tool of claim 3 wherein:
   the support means enables the anvil means to contact the cutting blade along a cutting edge of the blade.

5. The tool of claim 1 wherein:
   the support means is adapted to be connected to the rotary cutting cylinder and prevent the anvil means from moving tangentially relative to the cylinder.

6. The tool of claim 1 wherein:
   the support means is adapted to be connected to the rotary cutting cylinder and prevent the anvil means from moving rotatively relative to the cylinder.

7. The tool of claim 1 wherein:
   the connecting means is a lost motion connection that enables the anvil means to move relative to the support means when the support means is connected to the rotary cutting cylinder.

8. The tool of claim 1 wherein:
   the support means includes pin means adapted to be inserted into at least one hole provided in the rotary cutting cylinder to connect the support means to the cylinder.

9. The tool of claim 8 wherein:
   the pin means includes a pair of pins adapted to be inserted into a pair of holes provided in the rotary cutting cylinder.

10. The tool of claim 9, wherein:
    the pair of pins are connected to the anvil means by the connecting means, the connecting means being a lost motion connection that enables the pins to move axially relative to the anvil means.

11. The tool of claim 1 wherein:
    the anvil means includes a bar having a bottom surface adapted to contact the cutting blade of the rotary cutting cylinder, the support means being connected to the bar to enable the bar to move radially relative to the cylinder.

12. The tool of claim 11 wherein:
    the support means includes pin means adapted to be inserted into at least one hole provided in the rotary cutting cylinder, thereby connecting the support means to the cylinder.

13. The tool of claim 12, wherein:
    the pin means is connected to the bar of the anvil means by the connecting means, the connecting means being a lost motion connection that enables the bar to move relative to the pin means when the pin means connects the support means to the cylinder.

14. A height setting gauge for use in setting the height of a cutting blade on a rotary cutting cylinder,
    an anvil means;
    a support means connected to the anvil means and adapted to connect the anvil means to the rotary cylinder and support the anvil means on the cylinder while enabling the anvil means to move radially relative to the cylinder; and
    a blade contacting means on the anvil means, the contacting means being adapted to engage simultaneously the cutting blade and the cutting cylinder when the blade height has been set at a desired height relative to the cylinder.

* * * * *